Jan. 14, 1930.  C. H. HYLTON  1,743,892
AUTOMOBILE VEHICLE
Filed Nov. 3, 1927  3 Sheets-Sheet 1
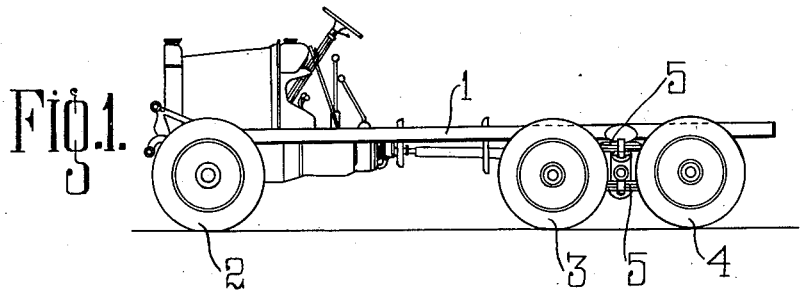
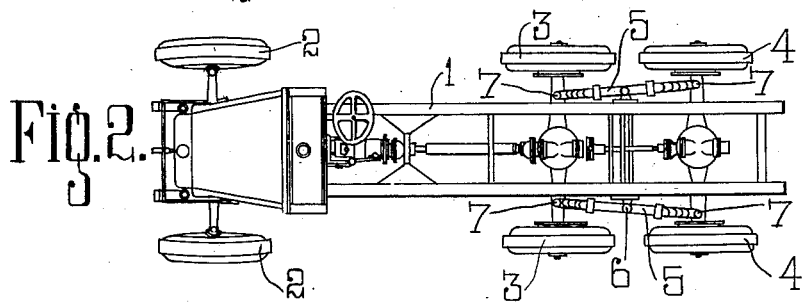
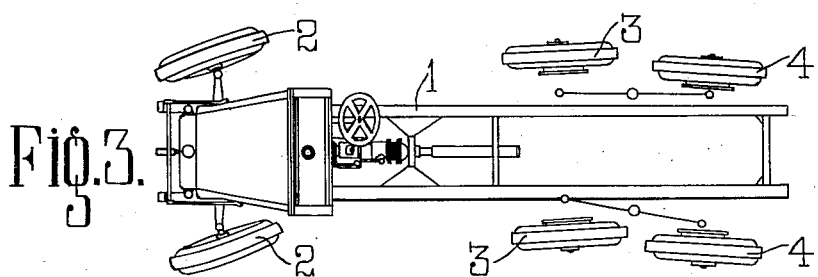
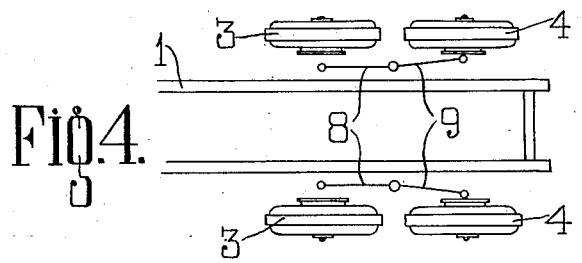
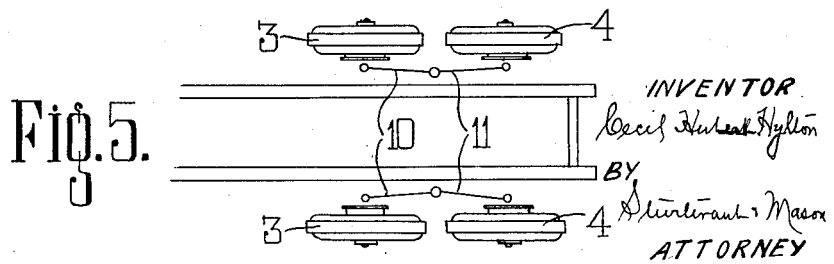
INVENTOR
Cecil Hubert Hylton
BY
Sturtevant & Mason
ATTORNEY Jan. 14, 1930. C. H. HYLTON 1,743,892
AUTOMOBILE VEHICLE
Filed Nov. 3, 1927 3 Sheets-Sheet 2
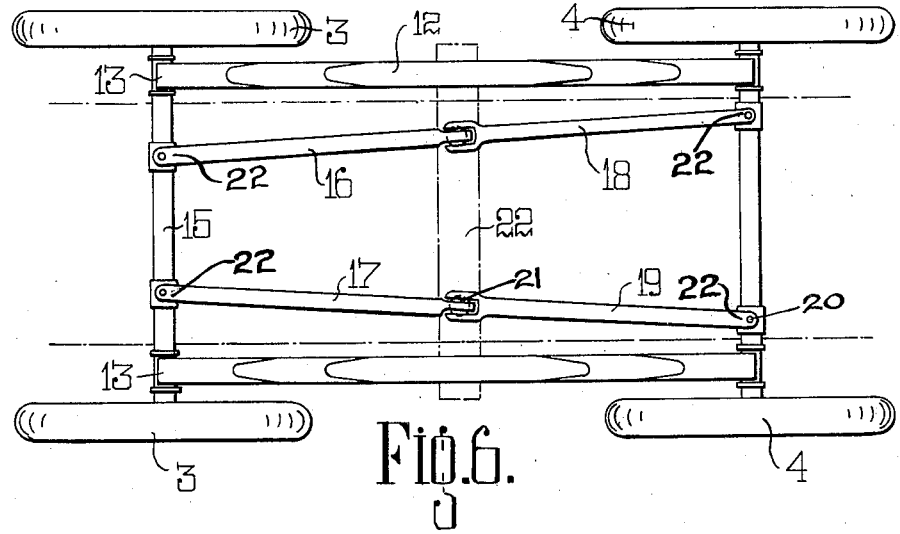
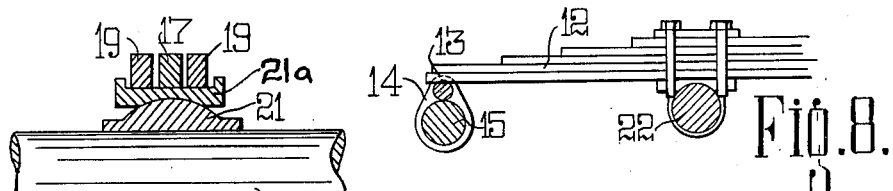
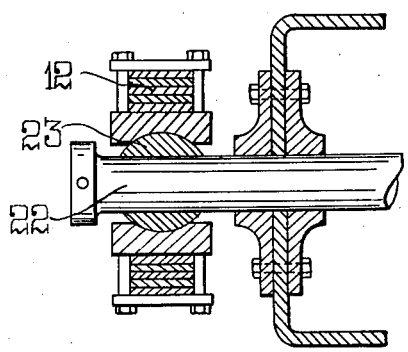
INVENTOR
Cecil Hubert Hylton
BY
Sturtevant & Mason
ATTORNEY Jan. 14, 1930.  C. H. HYLTON  1,743,892
AUTOMOBILE VEHICLE
Filed Nov. 3, 1927  3 Sheets-Sheet 3

INVENTOR
Cecil Hubert Hylton
BY
Sturtevant & Mason
ATTORNEY

Patented Jan. 14, 1930

1,743,892

UNITED STATES PATENT OFFICE

CECIL HUBERT HYLTON, OF BOURNE END, ENGLAND

AUTOMOBILE VEHICLE

Application filed November 3, 1927, Serial No. 230,778, and in Great Britain June 28, 1927.

The present invention relates to improvements in automobile vehicles of the type in which the vehicle is partly supported on a bogey, usually a four wheeled bogey.

According to the present invention each axle is capable of lateral displacement relating to the frame, its motion being controlled by connection between each axle and frame, one or both of said connections lying at an angle other than a right angle to the axle, whereby firstly, the advantage is obtained that the bogey axles are self tracking on the rounding of a curve, and secondly, the further advantage is obtained that the effective wheel base of the vehicle can be considerably reduced.

The invention is more particularly described with reference to the accompanying drawings in which:—

Figure 1 is a diagrammatic side elevation of a bogey vehicle according to the invention.

Figure 2 is a corresponding plan view.

Figure 3 is a similar view to Figure 2 showing the vehicle as turning on a curve.

Figure 4 is a diagrammatic plan view of a modification.

Figure 5 is a similar view of a further modification.

Figure 6 is a detail plan view on an enlarged scale of a modified type of bogey.

Figure 7 is a detail of the link connection of Figure 6.

Figure 8 is a detail of a spring mounting in side elevation.

Figure 9 is a corresponding top view.

Figure 10 is an end sectional elevation of a frame mounting.

Figure 11:
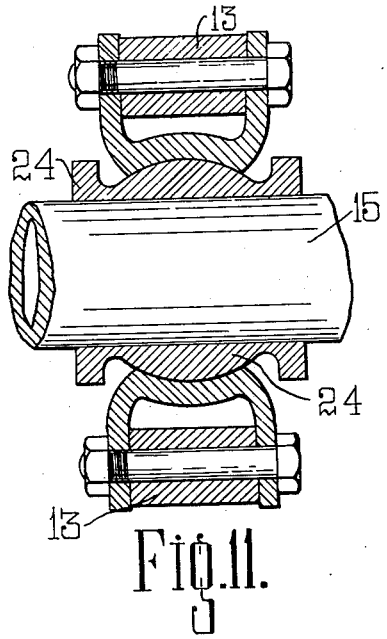
Figure 11 is a detail transverse sectional view of a modified spring-axle connection.

A rigid framed vehicle 1 is supported by steering wheels 2 and by bogey wheels 3, 4, suspended by duplex cantilever leaf springs 5 capable of swivelling in the mounting 6 on the frame and the axle connections 7. The springs 5 are arranged at an angle to the longitudinal axis of the vehicle, as shown, so that on turning a curve the axles will self-track as shown in Figure 3.

It is not essential for the mountings 6, 7, to be of the swivel type, as limited end play in the spring connections will equally serve to achieve a degree of self-tracking action.

In the arrangement of Figures 1 to 3 the spring halves lie in a straight line, but the advantages of this invention can be obtained where the front halves 8 of the springs can be parallel to the longitudinal axis of the vehicle, whilst the rear halves 9 (Figure 4) converge in plan toward the front of the vehicle. Or again (Figure 5) the front halves 10 of the springs may converge in plan towards the rear of the vehicle, whilst the rear halves 11 of the springs converge in plan towards the front of the vehicle.

It will be understood that a vehicle of this type, having all of its wheels adapted to move in steering and turning, has a "virtual wheel base" which is shorter than the wheel base of a vehicle having rigid bogey wheels, and hence permits the vehicle to turn on a shorter radius. Further, it is obvious that this virtual wheel base will vary according to the spring arrangement adopted.

Instead of or additionally to the springs forming a controlling connection, as in Figures 1 to 5, link or torque rod connections may be used, which are inclined to the longitudinal axis of the vehicle similarly as described for the springs (Figures 3, 4, and 5).

In one such arrangement, as shown in Figures 6 to 9, the springs 12 rigidly secured to the vehicle, have their ends 13 capable of limited lateral movement on the connection 14 to the axles 15, whilst link connections 16, 17, 18, 19 are secured by vertical swivel pins 20 to the axles, and upon the sleeves 21ª of a ball joint mounting 21 to the frame cross bar 22.

Owing to the inclination of the connections 16, 17, 18, 19 the axles will be self-tracking similarly as in the construction of Figures 1 to 3.

Whether such link connections are used, or whether the springs alone form the controlling connection, the springs 12 may be carried on the frame cross shaft 22 by a ball joint mounting as indicated at 23, Figure 10, and the spring ends 13 may be similarly mounted as by ball joint 24, Figure 11 on the axle 15.

Figure 12:
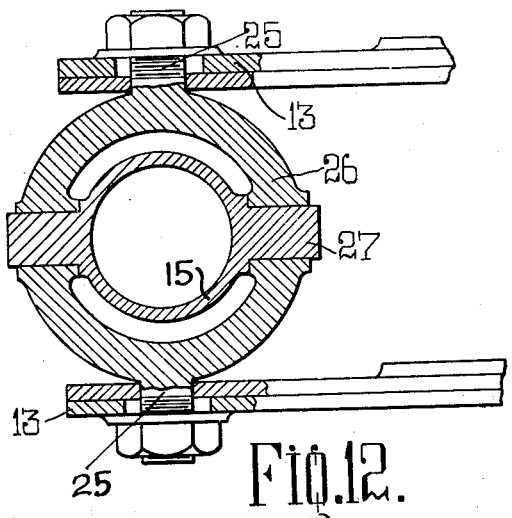
Figure 12 is a view of a further modified spring-axle construction shown in a section transverse to the axle axis.

An alternative form of spring-axle connection is shown in Figure 12 in which the spring ends 13 can swivel about vertical pins 25 on a yoke 26 swivelling on horizontal gudgeons 27 on the axle 15.

Figure 13:
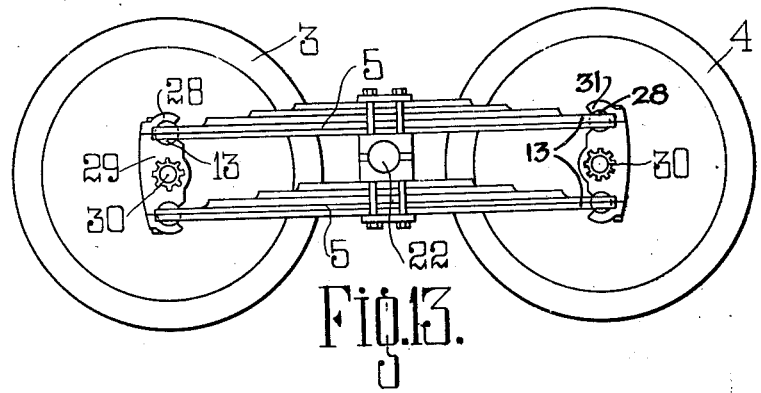
Figure 13 is a side elevation of a further modification of the bogey construction.
Figure 14:
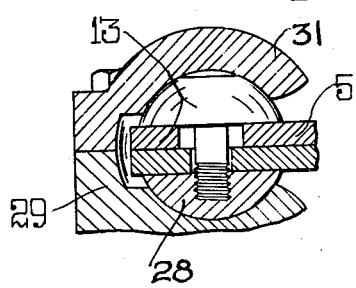
Figure 14 is a detail of the spring and connection seen in Fig. 13.

In the further form of construction shown in Figures 13 and 14 the ends 13 of the springs 5 have balls 28 connected to their ends housed in part spherical housings 29 splined on the axles 30 and held by part spherical caps 31.

I declare that what I claim is:—

1. An automobile vehicle comprising a chassis, steering wheels, a pair of bogey wheels, driving axles for said bogey wheels and connections between said axles and the frame inclined to the longitudinal axis of the frame.

2. An automobile vehicle comprising a chassis, steering wheels, a pair of bogey wheels, driving axles for said bogey wheels and spring connections between said axles and the frame inclined to the longitudinal axis of the frame.

3. An automobile vehicle comprising a chassis, steering wheels, a pair of bogey wheels, driving axles for said bogey wheels and connections between said axles and the frame inclined to the longitudinal axis of the frame, and swivel joints between said connections and the frame and said connections and the said axles.

4. An automobile vehicle comprising a chassis, steering wheels, a pair of driving axles, bogey wheels on said driving axles, connections between the frame and one axles lying parallel to the longitudinal axis of the vehicle, and connections between said frame and the other axle lying at an angle to the longitudinal axis of said frame.

In witness whereof, I have hereunto signed my name this 21 day of October 1927.

CECIL HUBERT HYLTON.